United States Patent [19]

Törby

[11] Patent Number: 4,665,400

[45] Date of Patent: May 12, 1987

[54] METHOD AND APPARATUS FOR RADAR SURVEILLANCE

[76] Inventor: Arne S. Törby, Spanngatan 14, 582 66 Linköping, Sweden

[21] Appl. No.: 545,390
[22] PCT Filed: Feb. 14, 1983
[86] PCT No.: PCT/SE83/00045
 § 371 Date: Sep. 29, 1983
 § 102(e) Date: Sep. 29, 1983

[30] Foreign Application Priority Data

Feb. 15, 1982 [SE] Sweden .................................. 8200895

[51] Int. Cl.[4] ............................................. G01S 13/04
[52] U.S. Cl. ...................................... 342/27; 342/189;
  • 342/378; 342/158
[58] Field of Search .............. 343/378, 383, 408, 5 PD

[56] References Cited

U.S. PATENT DOCUMENTS

| 3,268,893 | 8/1966 | Hauer | 343/16 LS |
|---|---|---|---|
| 4,079,379 | 3/1978 | Piesinger | 343/383 X |
| 4,079,381 | 3/1978 | Piesinger | 343/383 X |
| 4,152,702 | 5/1979 | Piesinger | 343/383 X |
| 4,156,876 | 5/1979 | Debuisser | 343/378 X |
| 4,156,877 | 5/1979 | Piesinger | 343/383 X |
| 4,180,814 | 12/1979 | Barton | 343/383 X |
| 4,285,048 | 8/1981 | Casasent et al. | 343/378 X |
| 4,309,769 | 1/1982 | Taylor, Jr. | 343/383 X |
| 4,315,263 | 2/1982 | Neidell | 343/378 X |

FOREIGN PATENT DOCUMENTS 1302923  1/1973  United Kingdom .

Primary Examiner—T. H. Tubbesing
Assistant Examiner—John B. Sotomayor
Attorney, Agent, or Firm—Lowe, Price, LeBlanc, Becker & Shur

[57] ABSTRACT

In a method and an apparatus for radar surveillance a multilobe antenna is commonly used for transmission as well as reception and distributes the power (P) to be radiated in several (n) simultaneous and uniform radiation lobes (L1-L7) which are swept across a zone to be surveyed.

The antenna properties are maintained invariant while each signal transmitted or received by the antenna is coded by allocating a particular code element ($\{\tilde{c}_i\}_1^n$) to each lobe (L1-L7). Each code element ($\{\tilde{c}_i\}_1^n$) is fixed for forming, when the lobes (L1-L7) sweep, the received signals into a reception sequence ($\{\tilde{S}_R\nu\}_1^n$) of elements ($\{\tilde{\sigma}_o\tilde{c}_\nu\}_1^n$) having predetermined mutual relations. The reception sequence is correlated by means of a correlation sequence of elements ($\{\tilde{c}_\nu^*\}_1^n$) which are proportional to the conjugated elements of the reception sequence.

21 Claims, 5 Drawing Figures

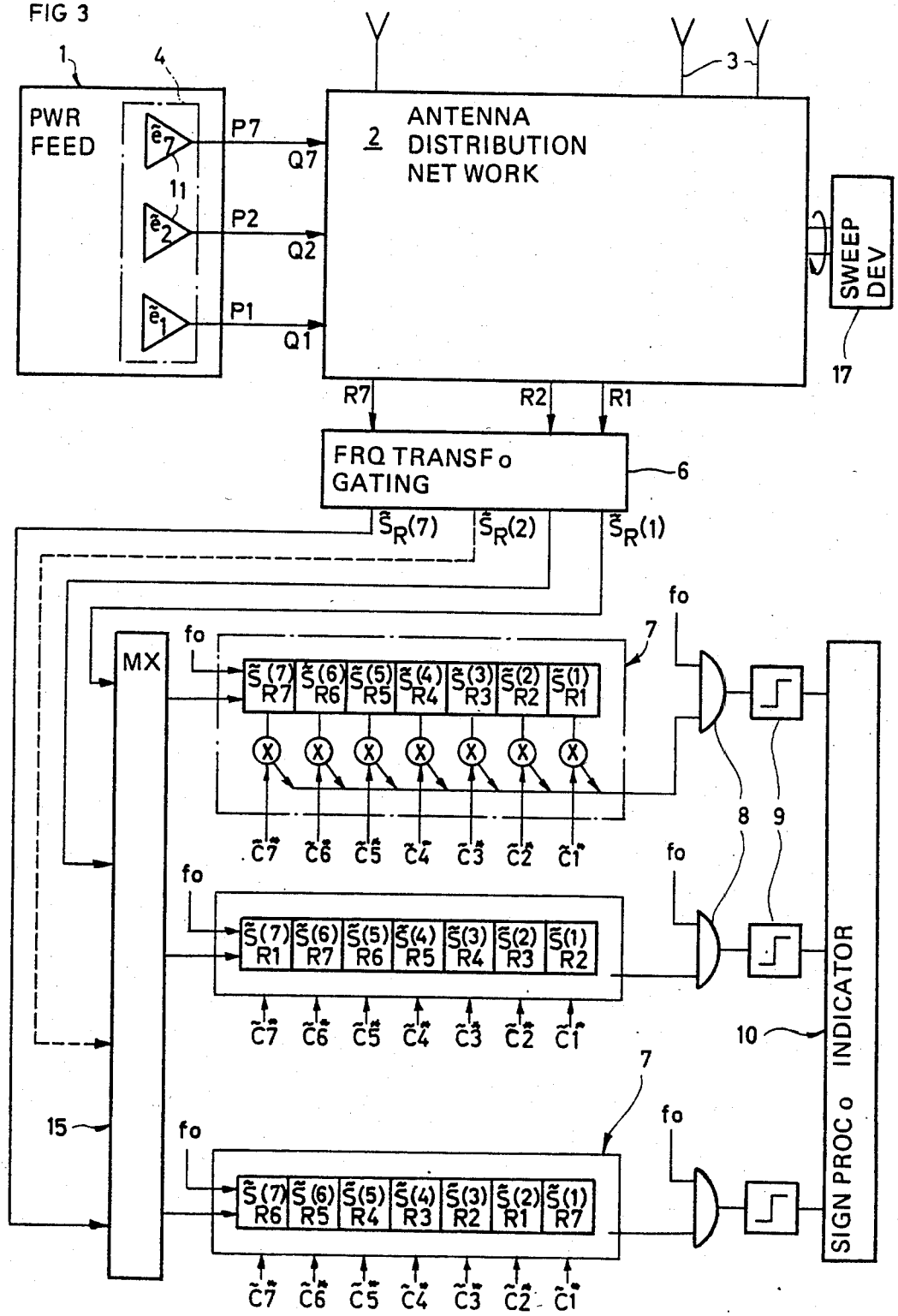

METHOD AND APPARATUS FOR RADAR SURVEILLANCE

TECHNICAL FIELD

The present invention relates to radar surveillance by means of a multi lobe antenna that is used for both transmission and reception. Power to be radiated by the antenna is distributed in several simultaneous and uniform radiation lobes which are swept across a zone to be surveyed.

BACKGROUND ART

In conventional, directed single lobe radar antennas the scanning of a target involves a risk of interception of the radiated radar signal, detection of said signal being dependent on the effective radiated power (ERP).

For reducing the risk of detection the radiated power has previously been reduced by distributing the power in the domains of time and frequency. However, this reduction of power has not been quite sufficient in practice to protect against detection.

British patent specification No. 1.302.923 discloses a scanning method for a fixed antenna where the lobe pattern of the antenna is varied by modulation of the antenna properties. The modulation is dependent on the radiation angle and is identified by means of correlators or matched filters. A control unit generates codes including modulation signals which represent phase and amplitude functions for each element of the antenna. The modulation signals are simultaneously supplied to a respective modulation member of each antenna element. The antenna transmits in sequence as many lobe patterns as the number of codes which are fed from the control unit to said modulation members.

In theory the modulation of the antenna properties according to said British patent specification should be satisfactory and would result in a small risk of detection due to a possible reduction of the radiated power. However, said method requires a large number of controllable modulation members, viz. equal to the number of antenna elements. The multitude of said controllable modulation members reduces the reliability, in spite of the fact that the antenna is fixed as is required for this method. Morever, the fact that the antenna is fixed and therefore covers a limited solid angle makes the method less attractive.

A more serious drawback of said method is that (as a result of the repeated variation of the lobe pattern which involves an undesired phase variation) the signal coherency during scanning on the target can only be attained for symmetric lobe patterns which results in a great limitation of the number of possible lobe patterns, in turn entailing a larger risk of detection than desired.

It is also known to distribute the radiated power spatially in several simultaneous time invariant lobes by means of a multilobe antenna thereby reducing the risk of detection. However, the relatively large angular value of the total sector angle of such a conventional multilobe radar antenna causes both the accuracy of measurment and the angular discrimination to become unsatisfactory.

DISCLOSURE OF THE INVENTION

It is the object of the invention to provide a method and an apparatus in radar surveillance which enhance protection against detection and at the same time facilitate a good angular discrimination between different targets and moreover facilitate a high accurracy of measurment.

This object is achieved by utilizing a single multilobe antenna for both transmission and reception for the radiation of the power supplied over several simultaneous and uniform lobes, said lobes being swept across a zone to be surveyed. According to the invention the antenna properties are maintained invariant and each signal transmitted or received by the antenna is coded by allocating a particular code element to each lobe. Each code element is fixed for forming, when the lobes sweep, the received signals into a reception sequence, the elements of which have predetermined mutual relations. The reception sequence is correlated by means of a correlation sequence, the elements of which are proportional to the conjugated elements of said reception sequence.

The elements having mutual predetermined relations form a sequence, which preferably is chosen such that its auto correlation function has a narrow and high maximum and small side lobes. The coding of the radiated singals corresponding to the antenna lobes results in an improved angular discrimination between different targets, said improvement being in proportyion to the number of main lobes. Due to this fact the power radiated in each lobe can be minimized to a previously unimagined extent.

A pre-requisite of the invention is that the signal reflected from the target is coherent (phase constant) or is brought to be coherent during the scanning of a target. This implies that the target has a small speed relative to the antenna or that compensation is achieved in this respect in the receiver circuits.

BRIEF DESCRIPTION OF THE DRAWINGS

The method is described below in more details in respect of two preferred embodiments of an apparatus for performing said method and with reference to the accompanying drawings.

FIG. 3 is a schematic illustration of a second embodiment of the invention also with seven main lobes of radiation, the coding procedure taking place at the transmitting end of the antenna.

MODES FOR CARRYING OUT THE INVENTION AND INDUSTRIAL APPLICABILITY

Figure 1:
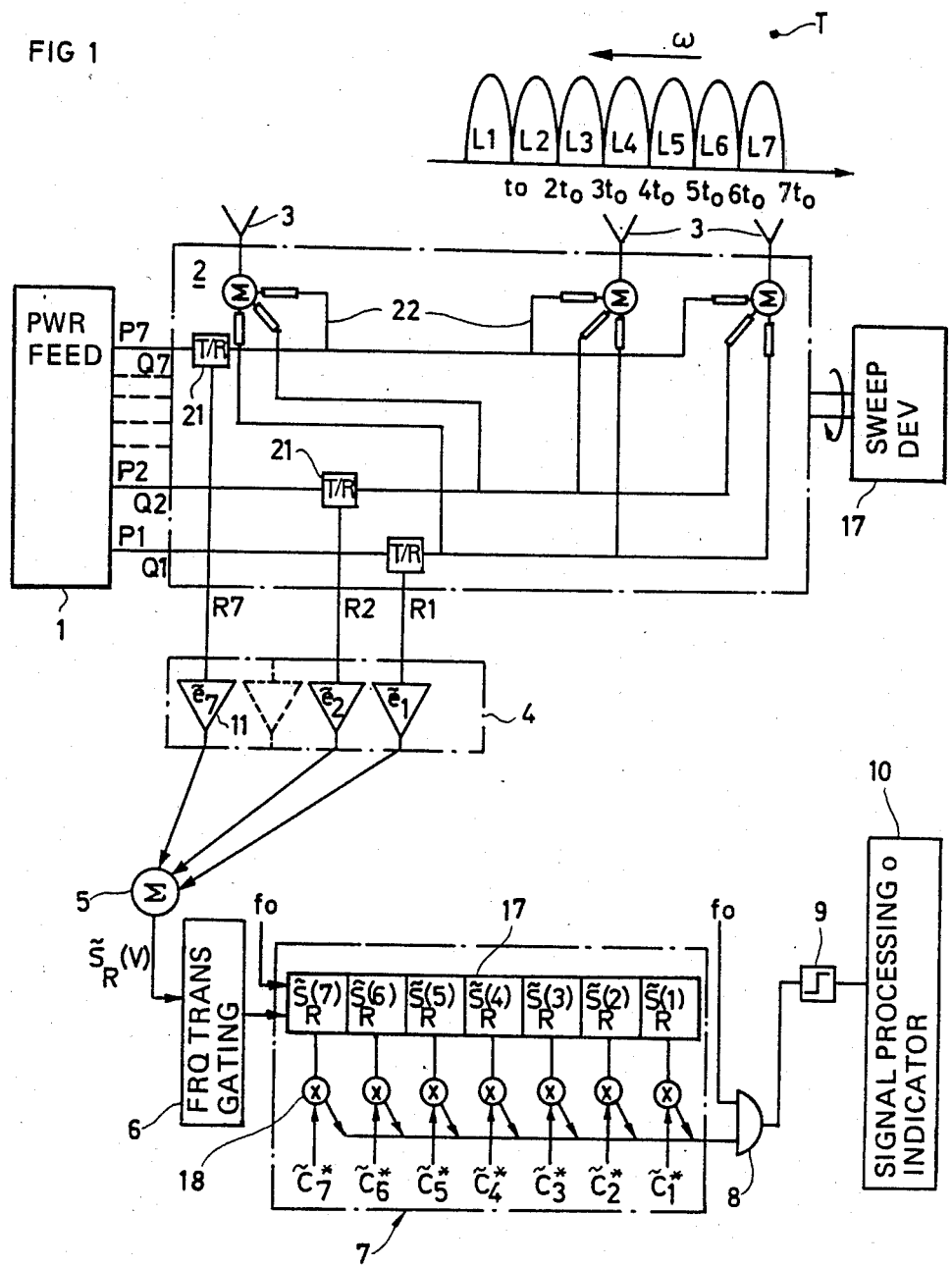
FIG. 1 is a schematic illustration of a first embodiment of the invention having seven main lobes of radiation, the coding procedure taking place at the receiver end of the antenna.
Figure 2:
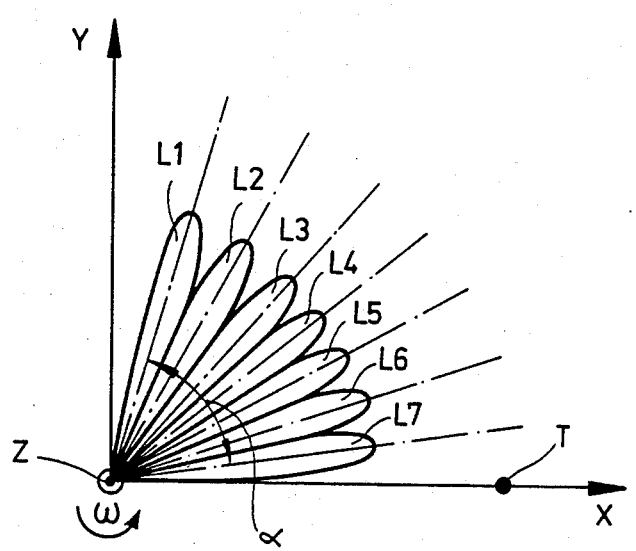
FIG. 2 is a polar diagram showing the seven main lobes of radiation.

In FIG. 1 there is shown an an example of the invention a multilobe radar antenna known per se and having n main lobes, seven lobes L1–L7 are shown here at the top of the drawing and are illustrated polarly in a system of coordinates XYZ in FIG. 2.

A transmission power P is intermittently or continuously fed to the antenna and is uniformly distributed in a power distribution means 1 via n=7 ports P1–P7 to corresponding input ports Q1–Q7 of an antenna distribution network 2. Via transmitter/receiver switches 21 and antenna element feed means 22 this network 2 distributes the power to m (only three are shown here) antenna elements 3 of the multi lobe an antenna each of which contributres to each one of the seven shown main lobes L1–L7 with a maximum gain in different directions of space. These simultaneously appearing lobes are uniform and spatially distributed with uniform pitch angle and with their main lobe axes in one plane over a sector angle of $\alpha$. The antenna feed means 22 are invariant, resulting in invariant antenna properties and radiation lobes which are invariant in time.

Moreover, to each main lobe L1–L7 contributions from the side lobes of the other lobes are obtained, which are not shown on the drawing. A sweeping device 17 operating at a sweeping rate $\omega$ sweeps the lobes around an axis transverse to the common main lobe axis plane, thereby providing coverage of a desired surveillance zone in space. Said sweep axis coincides with the Z-axis of the system of coordinates XYZ in FIG. 2.

Suppose that a main lobe, e.g. the lobe L7 shown in FIGS. 1 and 2, has just scanned a target T which is illustrated by a filled circle. An echo signal reflected from the target and received by the antenna is transferred through the distribution network 2 to its n, here seven, output ports R1–R7. Each output signal appearing on each of the ports R1–R7 is associated with one and the same main lobe or with a side lobe of any one of the other main lobes that falls within said main lobe. Thus, a signal appearing on the output port R1 is assumed to be associated with the lobe L1. According to the invention a coding device 4 is connected to the output ports R1–R7. The coding device allocates to each signal on the ports R1–R7 a specific code element ($e_1, e_2, \ldots e_7$). The notation $\widetilde{}$ over the elements $\tilde{e}_i$ indicates that said elements can be complex. Thus, both the amplitude and/or the phase can be coded. As explained below these code elements are a linear transformation of chosen code elements which have predetermined mutual relations in order to form a code having an auto correlation function with desired properties.

Said coding device 4 has a suitable construction and is here shown with individual coding means 11 embodied as an output amplifier for each code element $\tilde{e}_i$, said output amplifiers supplying coded output signals in parallel to an adding member 5. The output of the adding member 5 is connected to a frequency transforming and gating unit 6 which conventionally transforms the output signal $\widetilde{S}_R(\nu)$ of the adding member 5 from high frequency to an intermediate frequency or video frequency and also in a known manner gates said output signal when it is pulsed. The signals $\widetilde{S}_R(\nu), \nu=1$ to 7 form a sequence.

The output signal from the frequency transforming unit 6 is supplied to a correlator 7 or matched filters.

As soon as a lobe has scanned the target T a coded sum signal $\widetilde{S}_R(\nu)$ is obtained from the adding member 5; $\nu$ indicates the lobe number.

The coded sum signals $\widetilde{S}_R(1), \widetilde{S}_R(2), \ldots, \widetilde{S}_R(7)$ are fed synchonously with the system clock frequency $f_0$ which is proportional to the antenna rotation speed $\omega$, into the correlator 7. Here the correlator 7 includes a shift register 17 having seven cells each having an output connected to a respective multiplying junction 18. The outputs of the multiplying junctions are connected in series to an AND-gate 8 which is triggered by the clock frequency $f_0$.

A second input of each multiplying junction 18 is supplied with a respective correlation element $\tilde{c}_1^*, \tilde{c}_2^*, \ldots, \tilde{c}_7^*$ which is received from a not shown memory. Thus, in the course of shifting each sum signal $\widetilde{S}_R(\nu)$ stored in the cells of the shift register is multiplied with a respective correlation element.

The results from said multiplying junctions 18 are added and fed to a threshold circuit 9 via said AND-gate 8. The threshold level of the threshold circuit 9 is fixed to supply an output signal therefrom only when optimal correlation occurs for a received radar echo signal. The threshold circuit in its turn is connected to a signal processing circuit 10 for processing in any desired respect the signals fed thereto and having an indicator for indicating optimal correlation.

When as shown in FIGS. 1 and 2 the lobes L1 to L6 and the lobe L7 have just scanned the target T the coded sum signal $\widetilde{S}_R(7)$ is fed into the correlator 7 as shown in FIG. 1 and optimal correlation is obtained in the correlator since then a signal has been received from all the lobes in sequence. The threshold circuit 9 detects optimal correlation and supplies an output signal to the processing circuit 10. If the target has another angular position optimal correlation occurs at another time whenever the lobe L7 has just scanned the target.

The correlation elements $\{\tilde{c}_i^*\}_1^7$ are the conjugated elements of predetermined code elements $\{\tilde{c}_i\}_1^7$ in a code which desired properties.

The mutual relation between the chosen code elements $\{\tilde{c}_i\}$ and the code elements $\{\tilde{e}_i\}$ associated with the lobes is evident from the mathematical explanations below with reference to the embodiment in FIG. 1 when a point target T located at an azimuth angle of zero in the lobe diagrams of FIGS. 1 and 2 is scanned. The field intensity of the signal reflected from the target is $\tilde{\sigma}$ when the $\nu$:th lobe has just scanned the target at the time $t=\nu \cdot t_0$, where $t_0$ is the scanning time on target and thus is assumed to be constant during the scanning. The lobes are assumed to sweep anticlockwise in the direction of the arrow in FIG. 2. Each one of the main lobes L1 to L7 of the antenna receives contributions from the side lobes of the other mainlobes. Thus, $\tilde{g}_{\nu i}$ is the side lobe contribution of the i:th main lobe to the $\nu$:th mainlobe. The terms $\tilde{g}_{\nu i}$, $\nu$, $i=1$ to n express the invariant antenna properties.

Since the power is uniformly distributes over all main lobes the signal $\widetilde{S}_T(\nu)$ transmitted in the $\nu$:the lobe can be expressed in general for n main lobes:

$$\widetilde{S}_T(\nu) = (\tilde{g}_{\nu 1} + \tilde{g}_{\nu 2} + \ldots + \tilde{g}_{\nu n}), \text{ TM} \quad (1)$$

where $\tilde{g}_{\nu\nu}$ is the $\nu$:th main lobe.

In this and the following explanation of embodiments of the invention the equations are assumed to be normalized and the normalization factor is included in the terms $\tilde{g}_{\nu i}$.

The signal received $\widetilde{S}_R(\nu)$ (after normalization) at a time $t = \nu \cdot t_0$, i.e. when the $\nu$:th lobe has just scanned the target, on the outputs of the coding device 4 is (the wave propagation delay is neglected in order to simplify the explanation):

$$\widetilde{S}_R(\nu) = \widetilde{S}_T(\nu) \cdot (\tilde{g}_{\nu 1} \cdot \tilde{e}_1 + \tilde{g}_{\nu 2} \cdot \tilde{e}_2 + \ldots + \tilde{g}_{\nu n} \cdot \tilde{e}_n) \tilde{\sigma}_0, \quad (2)$$

where $\{\tilde{e}_i\}_1^n$ are the code elements of the coding device 4 and represent the phaseshift, the amplification or the attenuation in the respective antenna branches. If an underlined symbol signifies a vector, then $$(\tilde{g}_{v1} + \tilde{g}_{v2} + \ldots + \tilde{g}_{vn}) = (\tilde{g}_v^T \cdot 1), \quad (3)$$

which is the scalar product of the vectors $1 = (1, 1, \ldots 1)$ and $\tilde{g}_v^T = (\tilde{g}_{v1}, \tilde{g}_{v2} \ldots \tilde{g}_{vn})$. In the same way $$(\tilde{g}_{v1} \cdot \tilde{e}_1 + \tilde{g}_{v2} \cdot \tilde{e}_2 + \ldots + \tilde{g}_{vn} \cdot \tilde{e}_n) = (\tilde{g}_v^T \cdot \tilde{e}). \quad (4)$$

The vectors $\{\tilde{g}_v^T\}$ are dependent upon the antenna configuration and represent the row vectors of a square matrix G, while $\tilde{e}$ is a column vector.

Then for the $v$:th lobe the received signals appearing in sequence on the output of the adding member 5 can be expressed as:

$$\tilde{S}_R(v) = (\tilde{g}_v^T \cdot 1)(\tilde{g}_v^T \cdot \tilde{e}) \tilde{\sigma}_0. \quad (5)$$

If the correlation elements are designated $\tilde{c}^*$, the signal $\tilde{S}_c(v)$ in the correlator at the time $t = v t_0$ is:

$$\tilde{S}_c(v) = \tilde{S}_R(v) \cdot \tilde{c}_v^* = \tilde{\sigma}_0 \tilde{c}_v^* (\tilde{g}_v^T \cdot 1)(\tilde{g}_v^T \cdot \tilde{e}), \quad (6)$$

where $\{\tilde{c}_v\}_1^n$ are the code elements of the chosen code in question, which code elements have mutual predetermined relations which are unique for each code, and $\{\tilde{c}_v\}_1^n$, are the conjugated code elements.

For attaining optimal correlation it is required that $$(\tilde{g}_v^T \cdot 1)(\tilde{g}_v^T \cdot \tilde{e}) = \tilde{c}_v \quad (7)$$

which is a particular feature of the invention.

The row vectors $\tilde{g}_v^T$ in the matrix G, are invariant and known after calculation or measuring. Thus, the vector $\tilde{e}$ can easily be determined from the relation above as $$\tilde{e} = M \cdot \tilde{B}, \quad (8)$$

where $M = G^{-1}$, the inverse matrix of G if it exists, and the elements $\tilde{b}_i$ of $\tilde{B}$ are:

$$b_i = \frac{c_i}{(\tilde{g}_i^T \cdot 1)} = \frac{\tilde{c}_i}{\sum_{v=1}^{n} \tilde{g}_{iv}} i \quad (9)$$

$i = 1 \ldots n$

According to the invention the elements $(\tilde{c}_1, \tilde{c}_2, \ldots \tilde{c}_n)$ are the code elements of the code chosen beforehand, the conjugated code elements $(\tilde{c}_1^*, \ldots \tilde{c}_n^*)$ of which being allocated to a respective lobe of the antenna is proportional to the predetermied code vector $\tilde{c}$ and is obtained by solving the system of linear equations above.

With reference to FIG. 1 the following signal appears on the output of the correlator 7 in the course of correlation:

$$\sum_{v=\mu+1}^{n} \tilde{S}_R(v-\mu) \cdot \tilde{c}_v^* = \tilde{\sigma}_o \sum_{v=\mu+1}^{n} \tilde{c}_{v-\mu} \cdot \tilde{c}_v^* = \tilde{\sigma}_o R(\mu), \quad (10)$$

where $R(\mu)$ is the auto correlation function.

Optimal correlation results in $$\sum_{1}^{n} \tilde{S}_R(v) \cdot \tilde{c}_v^* = \tilde{\sigma}_o \sum_{1}^{n} \tilde{c}_v \tilde{c}_v^* = \tilde{\sigma}_o R(o), \quad (11)$$

where $R(o)$ is the maximum value of the auto correlation function.

Figure 5:
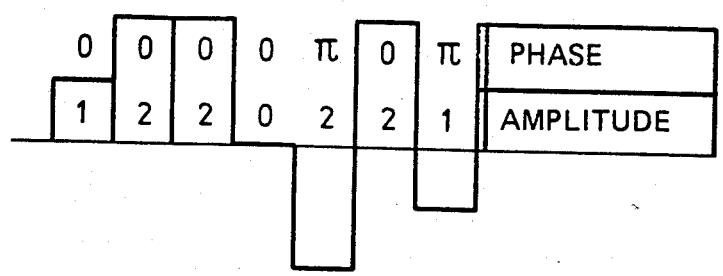
FIG. 5 illustrates an exemplary code.
Figure 4:
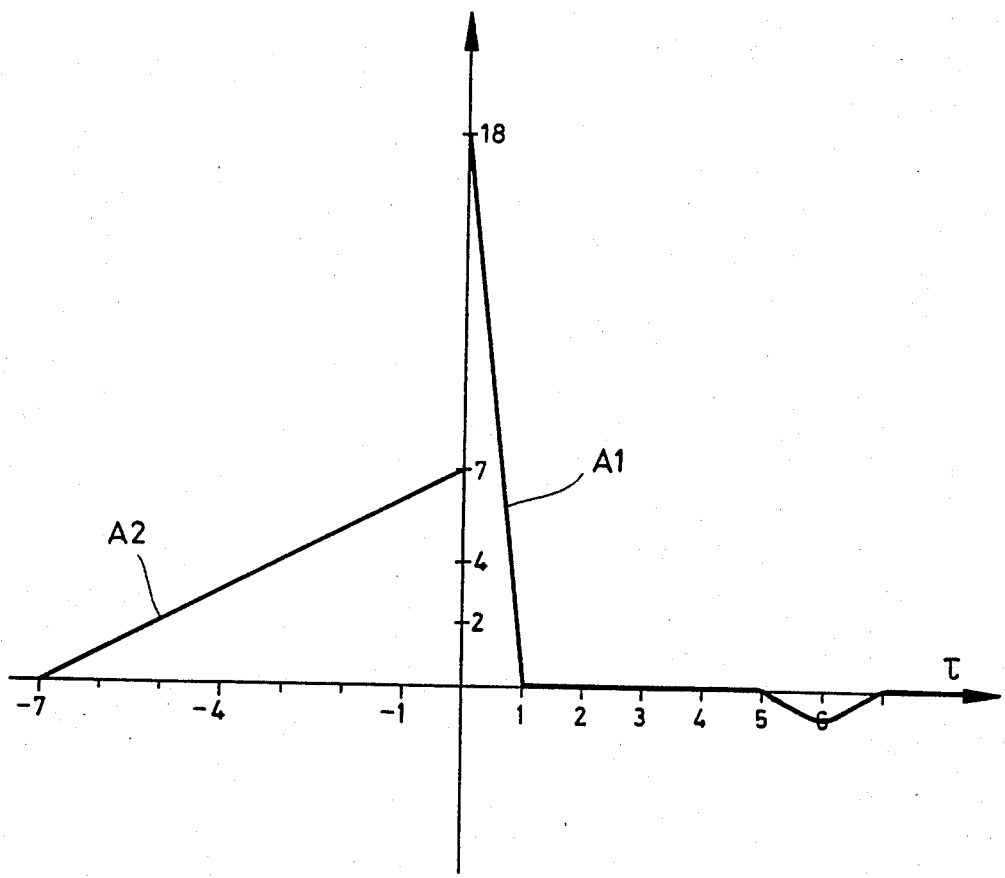
FIG. 4 is a diagram illustrating the auto correlation function of a here employed exemplary code, on one hand, and the auto correlation function obtained for a system including a conventional multi lobe antenna with seven main lobes and having no coding facility.

By choosing the code elements $\{\tilde{c}_v\}_1^n$ with skill an auto correlation code can be found which is very suitable to the purpose. Such a suitable auto correlation function has a narrow and high maximum and small side lobes. In the embodiment described above the invention has been tested by use of a Huffman $-7$ code and a Barker $-7$ code. Thus, in the Huffman $-7$ code 1, 2, 2, 0, $-2$, 2, $-1$ e.g. the phase is coded in 0 and $\pi$, as shown in FIG. 5, at the same time as the signal amplitude is varied synchronously with the code values. The theoretical auto correlation function A1 of this code is shown in FIG. 4 which for reasons of comparison also shows the theoretical auto correlation function A2 of a code having all seven code elements equal and used in a multi lobe radar antenna. In both cases the sectorangles of the lobes are equal as well as the overall radiated power. For the sake of clarity FIG. 4 only shows half of each of the auto correlation functions A1, A2.

The diagram of FIG. 4 shows that the allocation of the Huffman $-7$ code elements to the lobes results in an auto correlation function, the maximum of which is seven times varrower than without any coding. This implies that the angular discrimination as a principle is seven times better and so is the accuracy of angular measurements. Moreover, the side lobe relation is essentially larger which adds to a still better angular discrimination.

However, the invention is not restricted to the two mentioned codes but includes all codes having an auto correlation function of a similar quality.

Since the equation (6) of $\tilde{S}_c(v)$ is commutative, it is obvious that the factor $(\tilde{g}_v \cdot \tilde{e})$ can be referred to the transmitting end instead of the receiving end of the antenna and vice versa for $(\tilde{g}_v^T \cdot 1)$. This implies that the coding procedure can take place at the transmitting end instead of at the receiving end of the antenna. In that case the coding device 4 is connected between the unit 1 and the antenna distribution network 2, or is incorporated in the power distribution unit as shown in FIG. 3 which illustrates another further modified embodiment of the invention.

In the embodiment of FIG. 3 the coding device 4 having individual coding means 11 is located at the antenna transmitting end. Each coding means 11 allocates a particular code element $\tilde{e}_i$ to a respective main lobe $L_i$ by supplying, to each antenna feed means a signal in dependence of an appropriate code element $\tilde{e}_i$. The signals $\tilde{S}_{R\mu}(v)$ on the antenna receiving outputs $R\mu$ of the distribution network 2 are first fed to a frequency converter and gating unit 6, whereupon they are supplied in sequence via a multiplexor 15 to n (here seven) parallel correlators 7 similar to the one included in the embodiment of FIG. 1. Thus, the correlators 7 are activated in sequence, such that for instance when the first lobe L1 has scanned the target, the output signal $\tilde{S}_R(1)$ from the output R1, designated $\tilde{S}_{R1}(1)$, is fed to the first correlator 7 (the top one in FIG. 3) and the output $\tilde{S}_R(1)$ from the output R2, designated $\tilde{S}_{R2}(1)$, is fed to the second correlator 7, and so on. When the second lobe L2 has just scanned the target T, the output signal $\tilde{S}_{R2}(2)$ from the output R2 is fed to the first correlator 7 and the output signal $\tilde{S}_{R3}(2)$ from the output R3 to the second correlator 7 and so on.

When there is optimal correlation in any one of the correlators 7 as shown in the top correlator in FIG. 3, a signal is supplied via the threshold detector 9 to the signal processing circuit 10. In a mathematical explanation of this embodiment with the same premises, for the rest, as the embodiment of FIG. 1 the transmitted signal $\tilde{S}_T(\nu)$ can be written $\tilde{S}_T(\nu) = (\tilde{g}_\nu^T \cdot \tilde{e})$.

Similar to the explanation of the embodiment of FIG. 1 the equations here are supposed to be normalized, the normalization factor being included in the terms $\tilde{g}_\nu$ and $\tilde{g}_{\nu-\mu}$, respectively.

The output power is distributed to the antenna main lobes according to the code vector $\tilde{e}$. A signal $\tilde{S}_R(\nu)$ received from the $\nu$:th lobe and appearing on any output $R\mu$ from the antenna distribution network 2 can be expressed as $$\tilde{S}_R(\nu) = \tilde{S}_T(\nu) \cdot \tilde{\sigma} \cdot \tilde{g}_{\nu-\mu}, \qquad (12)\text{ ps}$$

where $\nu-\mu$ represents the angular deflection between the azimuthal angle of the target T and the pointing direction of the $\mu$:th lobe, and $\tilde{g}_{\nu-\mu}$ is the signal contribution of the $\nu$:th lobe to the $\mu$:th output $R\mu$.

This implies that:

$$\tilde{S}_{R\mu}(\nu) = (\tilde{g}_\nu^T \cdot \tilde{e}) \cdot \tilde{\sigma}_0 \tilde{g}_{\nu-\mu}. \qquad (13)$$

Let $\tilde{c}_\nu = (\tilde{g}_\nu^T \cdot \tilde{e})$ which can be expressed as $\tilde{e} = M\tilde{B}$, where each element $\tilde{b}_i$ of the column vector $\tilde{B}$ is proportional to $\tilde{c}_i$.

The weighted or coded signal from an output port $R_\mu$, after supply to a correlator 7 can be expressed as:

$$\tilde{S}_{R\mu}(\nu) \cdot \tilde{c}_\nu^* = (\tilde{g}_\nu^T \cdot \tilde{e}) \cdot \tilde{\sigma}_o \cdot \tilde{g}_{\nu-\mu} \cdot \tilde{c}_\nu^* = \qquad (14)$$

$$\tilde{\sigma}_o \cdot \tilde{c}_\nu \cdot \tilde{c}_\nu^* \cdot \tilde{g}_{\nu-\mu} = \tilde{\sigma}_o \cdot |\tilde{c}_\nu|^2 \cdot \tilde{g}_{\nu-\mu}.$$

When $\nu - \mu = \tau$ the correlated signal is $$\tilde{S}_c(\tau) = \tilde{\sigma}_o \sum_{\nu=1}^{n} |\tilde{c}_\nu|^2 \cdot \tilde{g}_\tau \qquad (15)$$

For $\tau = 0$ optimal correlation occurs and $$\tilde{S}_c(o) = \tilde{\sigma}_o \sum_{\nu=1}^{n} |\tilde{c}_\nu|^2 = \tilde{\sigma}_o \cdot \tilde{R}(o). \qquad (16)$$

Like the preceding embodiment of FIG. 1 the code elements $\tilde{c}_\nu$ are also here chosen to form a code with predetermined mutual relations between the code elements to obtain a code, the auto correlation function of which has a narrow main lobe with a high maximum value and small side lobe level.

In the embodiment of FIG. 1 a specific code element $\{\tilde{e}_j\}_1^7$ is allocated to each lobe L1 to L7, in the coding procedure either at the transmitting end or the receiving end, in order to generate the reception sequence $\{\tilde{S}_R(\nu)\}_1^7$, the elements $\{\tilde{\sigma}_0 \tilde{c}\}_H^7$ of which have predetermined relations.

In the embodiment according to FIG. 3 the coding at the transmitting end implies that the signals $\tilde{S}_R(\nu)$ appear at the receiving end output ports. The sequence which is useful in correlation after multiplexing can be defined as $\{\tilde{S}_R(\nu)\}_1^7$, and expressed as:

$$\tilde{S}_R(\nu) = (\tilde{g}_\nu^T \cdot \tilde{e}) \cdot \tilde{\sigma}_0 \tilde{g}_{\nu\nu} = \tilde{\sigma}_0 \tilde{c}_\nu \tilde{g}_{\nu\nu}, \qquad (17)$$

where $\tilde{g}_{\nu\nu}$ equals 1, at least in theory.

A further development of the invention involves an arrangement of antenna elements constituting a multi lobe antenna in two dimensions.

By means of the invention passive interception of the transmitted signal is made more difficult due to the fact that raidated power of the lobes can be very low as a result of the coding of the lobes. At the same time the angular discrimination is greatly increased. Interception of the transmitted signal is made further difficult if the signal is of the spread-spectrum type. Another advantage of the invention is the fact that as seen in FIG. 4, the side lobes closest to the synthesized main lobe of the auto correlation function, can be made extremely small if the code is chosen with skill. Consequential advantages hereof are an improved angular discrimination of targets, and a reduction of noise caused by the echo signals in the antenna side lobes, as well as certain ground echo suppression.

I claim:

1. A method of radar surveillance by means of a multi lobe antenna commonly used for transmission and reception, distributing power (P) to be radiated in several (n) simultaneous and uniform radiation lobes (L1–L7), sweeping said lobes across a zone to be surveyed, characterized by maintaining the antenna properties invariant, coding each signal transmitted or received by the antenna, by allocating a particular code element $(\{\tilde{e}_i\}_1^n)$ to each lobe (L1–L7), fixing each code element $(\{\tilde{e}_i\}_1^n)$ for forming, when the lobes sweep, the received signals into a reception sequence $(\{\tilde{S}_R(\nu)\}_1^n)$ of elements $(\{\tilde{\sigma}_0 \tilde{C}_\nu\}_1^n; \{\tilde{\sigma}_0 \tilde{C}_\nu \tilde{g}_{\nu\nu}\}_1^n)$ having predetermined mutual relations, and correlating said reception sequence $(\{\tilde{S}_R(\nu)\}_1^n)$ by means of a correlation sequence of elements $(\{\tilde{c}_\nu\}_1^n)$ which are proportional to the conjugated elements of the reception sequence.

2. The method as claimed in claim 1, characterized by coding the received signals and adding the coded signals for generating the reception sequence $(\{\tilde{S}_R(\nu)\}_1^n)$, the elements $(\{\tilde{\sigma}_0 \tilde{c}_\nu\}_1^n)$ of which have predetermined mutual relations.

3. The method as claimed in claim 1 characterized by coding the transmitted signals and adding the received coded signals for generating the reception sequence $(\{\tilde{S}_R(\nu)\}_1^n)$, the elements $(\{\tilde{\sigma}_0 \, C_\nu\}_1^n)$, of which have predetermined mutual relations.

4. The method as claimed in claim 1, characterized by coding the transmitted signals and multiplexing the received coded signals associated with each lobe, for generating the reception sequence $(\{\tilde{S}_R(\nu)\}_1^n)$, the elements $(\{\tilde{\sigma}_0 \, \tilde{c}_\nu g_{\nu\nu}\}_1^n)$ of which have predetermined mutual relations.

5. The method as claimed in any one of claims 1 to 4, wherein said predetermined mutual relations between the elements of the reception sequence $(\{\tilde{S}_R(\nu)\}_1^n)$ is expressed as a sequence $(\{\tilde{c}_i\}_1^n$, characterised in that the code elements $(\tilde{e}_1, \tilde{e}_2, \ldots \tilde{e}_n)$ allocated to the lobes (L1–L7) are determined by means of a linear system of equations $$\tilde{e} = M\tilde{B},$$

where M is a square matrix dependent on the design of the antenna, and $\tilde{B}$ is a column vector, each element $(\tilde{b}_i)$ of which is proportional to a corresponding element $(\tilde{c}_i)$ of said sequence expressing the relations between the elements of the reception sequence $(\{\tilde{S}_R(\nu)\}_1^n)$.

6. An apparatus for radar surveillance comprising a multi lobe radar antenna commonly used for transmission and reception and having antenna elements (3), an antenna distribution network (2) and signal power means (1) connected thereto for distributing over the distribution network (2) a supplied signal power (P) for generating several (n) simultaneous and uniform radiation lobes (L1-L7), and means (17) for sweeping said lobes over a zone to be surveyed characterized in that the antenna distribution network (2) is invariant, that a coding means (4) is associated with the antenna distribution network (2) to allocate a particular code element ($\{e_i\}_1^n$) to each lobe (L1 to L7) in reception mode or transmission mode, that said code elements ($\{\tilde{e}_i\}_1^n$) are fixed for forming, when the lobes sweep, the received signals into a reception sequence ($\{\tilde{S}_R(\nu)\}_1^n$) of elements ($\{\tilde{\sigma}\,\tilde{c}_\nu\}_1^n$; $\{\tilde{\sigma}\,\tilde{c}_\nu\tilde{G}_\nu\}_1^n$) having predetermined mutual relations, and that correlation means (7) is provided for correlating said reception sequence ($\{\tilde{S}_R(\nu)\}_1^n$) by means of a correlation sequence of elements ($\{\tilde{c}_\nu\}_1^n$) which are proportional to the conjugated elements of said reception sequence.

7. The apparatus as claimed in claim 6, characterized in that the coding means (4) is provided at the receiving end of the antenna and has several (n) outputs each corresponding to a radiation lobe (L1 to L7), and that an adding member (5) is connected to the coding means (4) for generating the reception sequence ($\{\tilde{S}_R(\nu)\}_1^n$) by summing the output signals of the coding means (4).

8. The apparatus as claimed in claim 6, characterized in that the coding means (4) is provided at the transmission end of the antenna for modulating in dependence of the code elements ($\tilde{e}_1, \tilde{e}_2 \ldots \tilde{e}_n$) the signal to be radiated in each lobe, and that an adding member is connected to the antenna output ports (R1 to R7) at the receiving end of the antenna for generating the reception sequence ($\{\tilde{S}_R(\nu)\}_1^n$) by summing the received coded signals.

9. The apparatus as claimed in claim 6, characterized in that the coding means (4) is provided at the transmission end of the antenna for modulating in dependence of the code elements ($\tilde{e}_1, \tilde{e}_2 \ldots \tilde{e}_n$) the signal to be radiated in each lobe, and that a multiplexor (15) is connected to output ports (R1-R7) of the antenna distribution network (2) for generating the reception sequence ($\{\tilde{S}_R(\nu)\}_1^n$) in multiplexing.

10. The apparatus as claimed in any one of claims 6 to 9, wherein said predetermined mutual relations between the elements of the reception sequence ($\{\tilde{S}_R(\nu)\}_1^n$), characterized in that the coding means is operable for allocating code elements ($\tilde{e}_1, \tilde{e}_2$ is operable for allocating code elements ($\tilde{e}_1, \tilde{e}_2, \ldots, \tilde{e}_n$) to the lobes (L1-L7) by a linear system of equations $$\tilde{e} = M \tilde{B},$$

where M is a square matrix dependent on the design of the antenna, and $\tilde{B}$ is a column vector, each element ($\tilde{b}_i$) of which is proportional to a corresponding element ($\tilde{c}_i$) of said sequence expressing the relations between the elements of the reception sequence ($[\tilde{S}_R(\nu)]_{1n}$).

11. A method of radar surveillance of an area, the method including the steps of repetitively generating by means of a multi-lobe antenna an invariant illuminating signal pattern comprising a plurality of lobes extending in a common plane in different directions from said antenna, scanning said area with said pattern by rotating said antenna, receiving by means of said antenna the successive echo signals resulting from successive illumination of a target in said area, during the scanning of said area, by the generated signals associated with said lobes, separately modifying the echo signals associated with the individual lobes according to a predetermined coded composed of a plurality of coding signals each of which affects at least one of the amplitude and phase of one of said echo signals, correlating the encoded signals with a sequence of correlation signals, and monitoring the amplitude of the resulting autocorrelation signal.

12. A method as recited in claim 11 wherein said correlating step comprises correlating the encoded echo signals with a sequence of correlation signals equal in number to the number of the lobes, said correlation signals being selected to be respectively proportional to the complex conjugate of differing encoded echo signals associated with respective lobes.

13. An apparatus for radar surveillance comprising a rotatable antenna including a plurality of radiating elements (3), RF-power generating means (1), a power distributing network (2) arranged between said RF power generating means and said antenna so as to feed RF power to said radiating elements; the antenna, the RF power generating means and the power distributing network being arranged so as to generative repetitively a transmitted invariant illuminating signal pattern comprising a plurality of lobes extending in a common plane in different directions from said antenna, signal processing means for echo signals successively received by said antenna when a target in the area under surveillance is successively illuminated, during the scanning of said area, by the radiated signals associated with each lobe, an encoded circuit arranged to modity individually and in accordance with a predetermined code the echo signals associated with the different lobes, said code comprising for each of said lobes a coding signal affecting at least one of the amplitude and phase of the echo signal associated with the respective lobe, a correlator (7) arranged to correlate the encoded echo signals with a sequence of correlation signals equal in number of the lobes, said correlating signals being selected to be respectively proportional to the complex conjugate of differing encoded echo signals associated with respective lobes, circuit means (9) for monitoring the amplitude of the correlation signal generated in the correlator.

14. In a radar surveillance apparatus including multilobe radar antenna means for transmission and reception of radar signals having a plurality of antenna elements, a distribution network and signal power means connected thereto for distributing a supplied signal power for generating a plurality of radiation lobes, and means for sweeping the lobes over a zone to be surveyed, the improvement comprising a structure for reducing risk of detection of power radiated by the surveillance apparatus, including:

an invariant structure for said antenna means having substantially invariant antenna characteristics for generating substantially uniform and invariant radiation lobes;

coding means connected to the distribution network for providing respective fixed code elements to encode respective lobes for forming, when the lobes are swept over the surveyed zone, a sequence of reception signal elements having predetermined mutual relationships; and correlation means for correlating said sequence of reception signal elements with a sequence of correlation elements having a predetermined relation to the antenna characteristics and to said fixed code elements.

15. An improved radar surveillance apparatus as recited in claim 14 wherein said radar surveillance apparatus includes a receiving portion, said coding means connected to said receiving portion, said receiving portion having a plurality of n outputs provided to said coding means and corresponding respectively to said radiation lobes, said coding means operable for providing a plurality of n outputs corresponding respectively to encoded representations of said outputs of the receiving portion, and further comprising first adding means connected to said coding means for adding said plurality of outputs thereof to form said sequence of reception signal elements.

16. An improved radar surveillance apparatus as recited in claim 15 wherein said correlation means comprises shifting means receiving said sequence of reception elements for providing a plurality of an outputs representing a sequence of n said reception signal elements, and a plurality of multiplying means for multiplying said n outputs of said shifting means by corresponding ones of said correlation elements.

17. An improved radar surveillance apparatus as recited in claim 16 further comprising second adding means for adding outputs of said multiplying means to provide a correlation output representing a correlation function between said sequence of received signal elements and said correlation elements, and threshold detecting means for providing an input to a signal processing means when said correlation function exceeds a predetermined threshold.

18. An improved radar surveillance apparatus as recited in claim 17 wherein said correlation means is operable for providing said correlation elements to said shifting means as a sequence of numbers $$(\tilde{g}_\nu^T \cdot 1)\, (\tilde{g}_\nu^T \tilde{e}) = \tilde{c}_\nu$$

where:

$\tilde{c}_\nu$ is a conjugate of a correlation element $\tilde{c}_\nu^*$ for the $\nu$th lobe, $\tilde{g}_\nu$ is a vector or elements $[\tilde{g}_{\nu i}]_1^n$ representing side lobe contributions of an $i^{th}$ main lobe to a $\nu^{th}$ main lobe as a function of invariant antenna properties, 1 is a unity vector, and $\tilde{e}$ is a vector of elements $[e_i]_1^n$ representing said fixed code elements provided by said coding means.

19. An improved radar surveillance apparatus as recited in claim 14 wherein said coding means is connected to a transmitting portion of said apparatus for providing to each antenna element a particular code element $e_i$ for a respective lobe $L_i$, further comprising multiplexing means connected to receive separate received signals corresponding to respective lobes, and wherein said correlation measns is connected to receive separate signals corresponding to respective lobes from said multiplexing means, said correlation means comprising a plurality of sequentially activated correlators respectively operable to correlate signals associated with each lobe.

20. An improved radar surveillance apparatus as recited in claim 19 wherein said plurality of correlators are operable for providing said correlation elements by providing said correlation elements as a sequence of numbers $$(\tilde{g}_\nu^T \cdot 1)\, (\tilde{g}_\nu^T \tilde{e}) = \tilde{c}_\nu$$

where:

$\tilde{c}_\nu$ is a conjugate of a correlation element $\tilde{c}_\nu^*$ for the $\nu$th lobe, $\tilde{g}_\nu$ is a vector of elements $[\tilde{g}_{\nu i}]_1^n$ representing side lobe contributions of an $i^{th}$ main lobe to a $\nu^{th}$ main lobe as a function of invariant antenna properties, 1 is a unity vector, and $\tilde{e}$ is a vector of elements $[\tilde{e}_i]_1^n$ representing said fixed code elements provided by said coding means.

21. An improved radar surveillance apparatus as recited in claim 14 wherein said coding means comprises means for producing a sequence of predetermined code elements $\{\tilde{c}_\nu\}_1^7$ related to said invariant antenna characteristics, output means for providing a sequence of signals proportional to said predetermined code elements at a receiver output, said means for transmission comprising means for generating a sequence $\{\tilde{e}_\nu\}_1^7$, and said correlation means comprises means for performing a scalar multiplication of said predetermined code elements and conjugates thereof for yielding a maximum correlation.

* * * * *